(12) United States Patent
Owa

(10) Patent No.: US 6,687,826 B1
(45) Date of Patent: *Feb. 3, 2004

(54) OPTICAL DISC AND METHOD OF RECORDING DATA INTO SAME

(75) Inventor: Hideo Owa, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,458

(22) Filed: Dec. 28, 1998

(30) Foreign Application Priority Data

Dec. 29, 1997 (JP) ............................................. 9-369262

(51) Int. Cl.[7] .......................... H04L 9/32; G06F 11/30; G06F 12/14
(52) U.S. Cl. .................................... 713/193; 369/47.12
(58) Field of Search ...................... 369/47, 59; 380/44, 380/281; 713/193

(56) References Cited

U.S. PATENT DOCUMENTS

| | | | | |
|---|---|---|---|---|
| 5,101,478 A | * | 3/1992 | Fu et al. ........................ 710/1 |
| 5,434,723 A | * | 7/1995 | Aoki ............................ 360/70 |
| 5,452,284 A | * | 9/1995 | Miyagawa et al. ......... 369/124 |
| 5,561,644 A | * | 10/1996 | Kondo ......................... 369/32 |
| 5,757,824 A | * | 5/1998 | Arai et al. ................... 714/755 |
| 5,761,301 A | * | 6/1998 | Oshima et al. ............... 705/57 |
| 5,774,289 A | * | 6/1998 | Seki ............................ 360/48 |
| 5,835,478 A | * | 11/1998 | Kobayashi et al. ....... 369/275.3 |
| 5,857,020 A | * | 1/1999 | Peterson, Jr. .................. 380/4 |
| 5,933,410 A | * | 8/1999 | Nakane et al. |
| 5,978,350 A | * | 11/1999 | Tobita et al. ............ 369/275.3 |
| 6,034,932 A | * | 3/2000 | Ishida et al. .................. 369/47 |
| 6,081,785 A | * | 6/2000 | Oshima et al. ................ 705/1 |
| 6,097,694 A | * | 8/2000 | Ishida et al. ............. 369/275.3 |
| 6,118,632 A | * | 9/2000 | Albrecht et al. ............. 360/135 |
| 6,128,260 A | * | 10/2000 | Tanoue et al. ................ 369/47 |
| 6,208,603 B1 | * | 3/2001 | Ishida et al. .................. 369/59 |
| 6,226,247 B1 | * | 5/2001 | Sako et al. ................... 369/54 |
| 6,229,896 B1 | * | 5/2001 | Gotoh et al. ................ 380/203 |

OTHER PUBLICATIONS

Menezes, Handbook of Applied Cryptography, 1996, pp 493,551.552.*

* cited by examiner

Primary Examiner—Gilberto Barrón
Assistant Examiner—Douglas J. Meislahn
(74) Attorney, Agent, or Firm—Frommer Lawrence & Haug LLP; William S. Frommer

(57) ABSTRACT

An optical disc (1) has a plurality of sectors each including a header area and a recording area, in which a position where a predetermined amount of data is recorded provides an ID information (medium ID peculiar to the optical disc). The ID information in the optical disc (1) is used by a first encryption circuit (12) to encrypt a disc key to encrypt AV data as a whole, the encrypted disc key is used by a second encryption circuit (13) to encrypt a sector key to encrypt the AV data for each program, and the encrypted sector key is used by a third encryption circuit (14) to encrypt the AV data for each program. The AV data subjected to at least the first to third encryptions is recorded into the recording area of the optical disc (1).

24 Claims, 13 Drawing Sheets

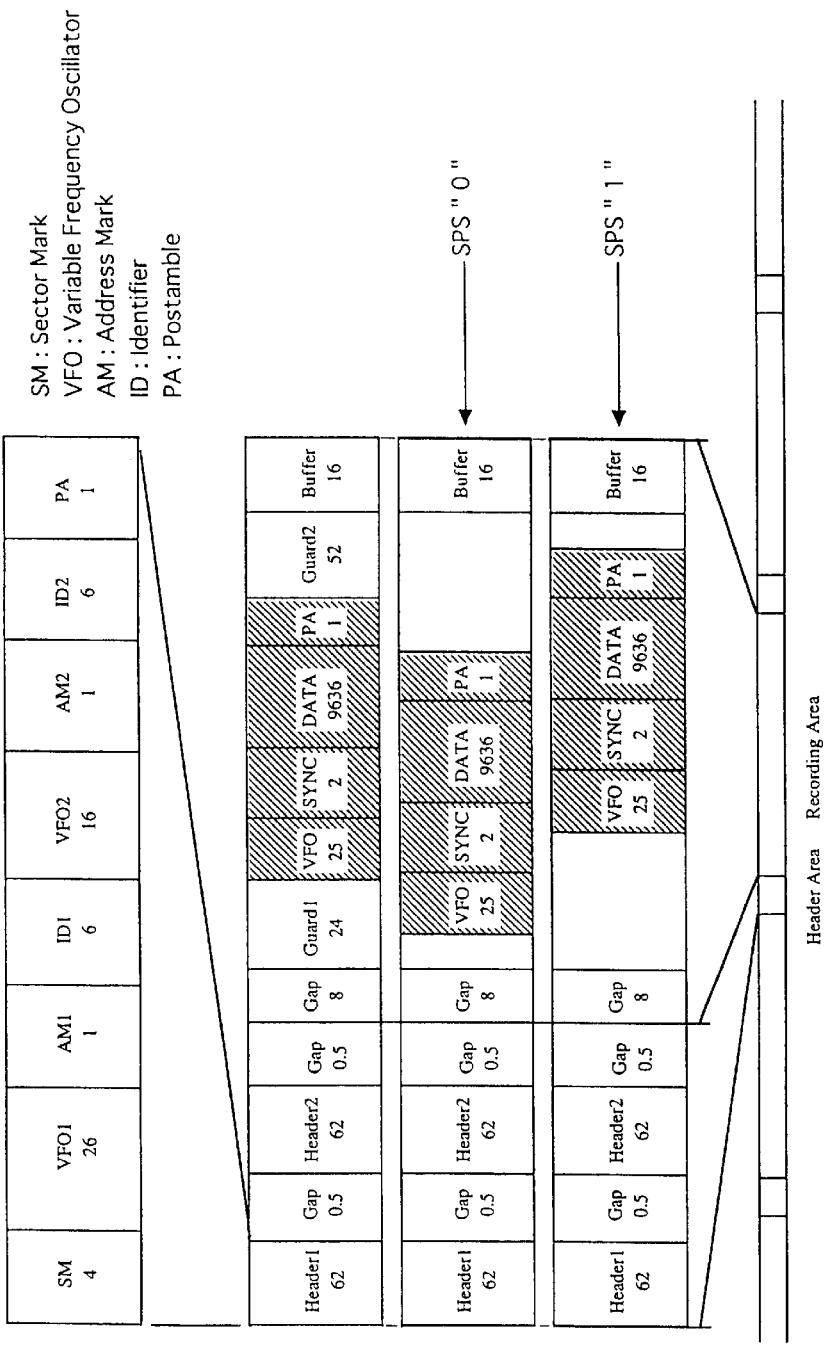

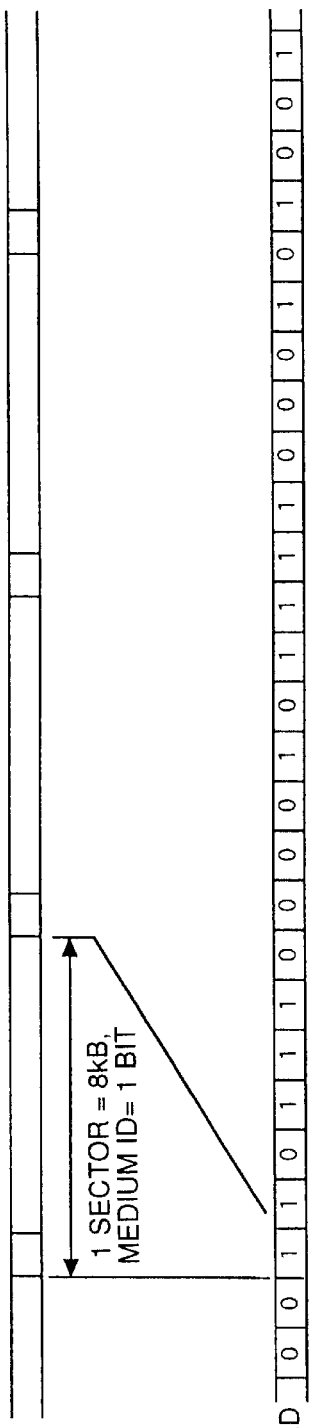
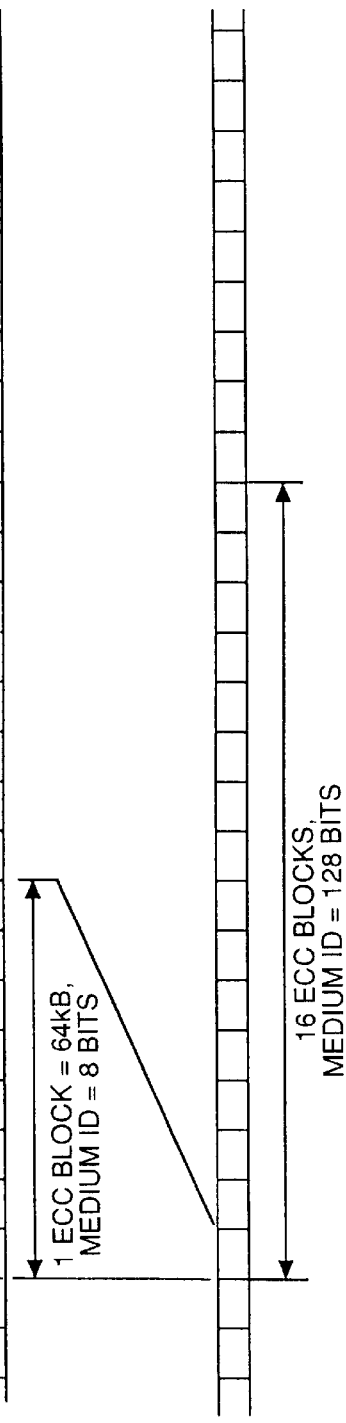
FIG.4A  FIG.4B  FIG.4C

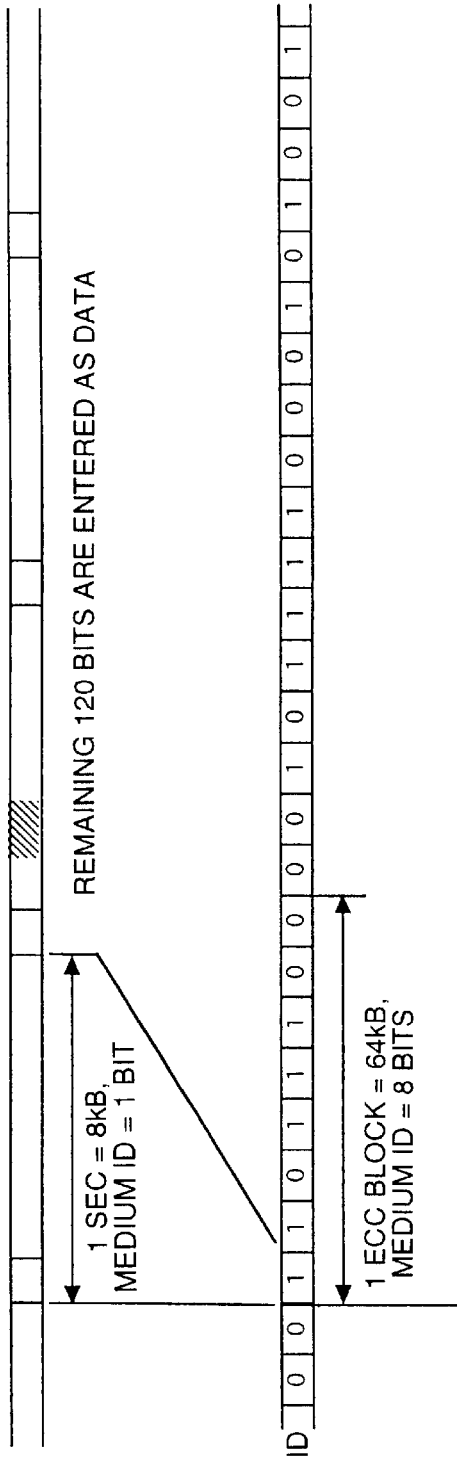

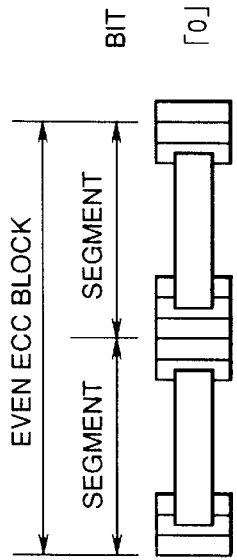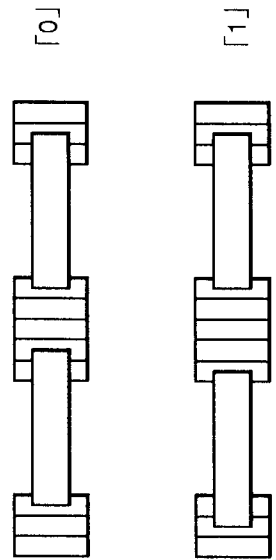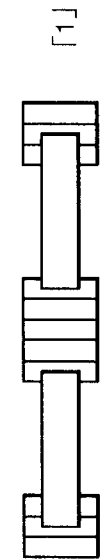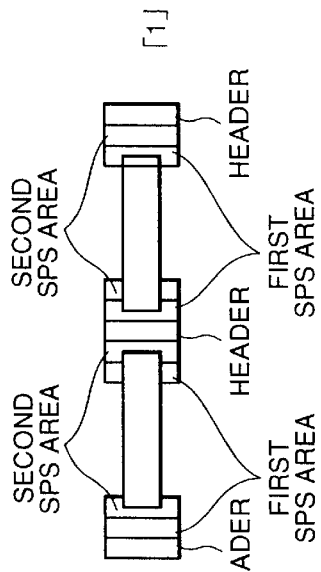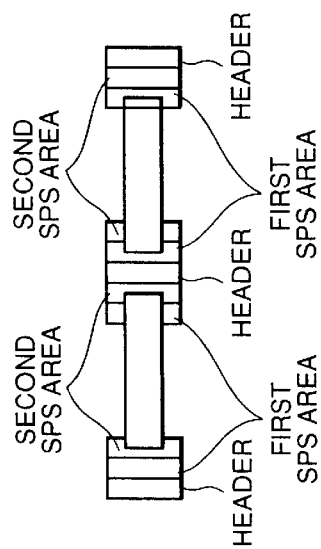
FIG.12A FIG.12B FIG.12C FIG.12D

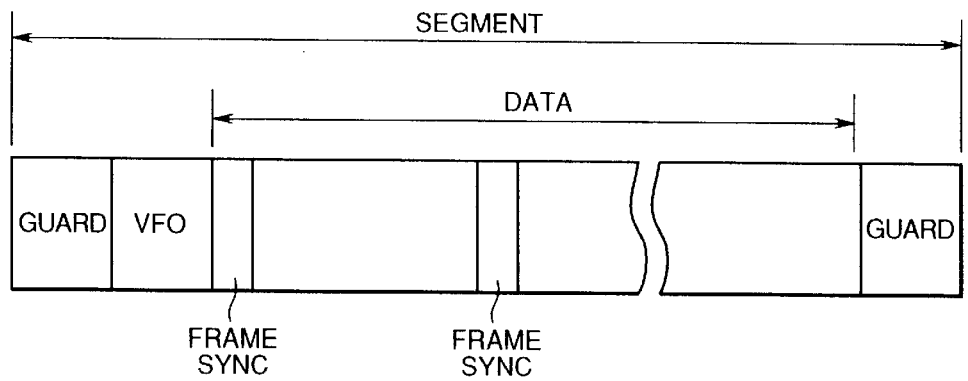
FIG.13
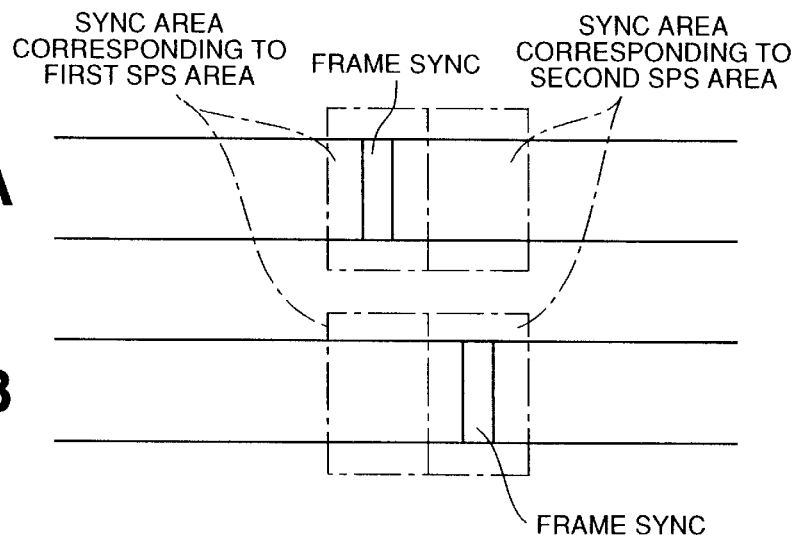
FIG.14A
FIG.14B

OPTICAL DISC AND METHOD OF RECORDING DATA INTO SAME

BACKGROUND OF THE INVENTION

1. Field of the Invention

The present invention relates to an optical disc including a feature of protection against illegal or impermissible copying of data from the optical disc, and a method of recording data into the optical disc.

2. Description of Related Art

The disc drive compatible with recordable optical discs of phase-change type such as so-called DVD-RAM disc, etc. records AV data including video signal, audio signal, etc. through encryption of the AV data. To reproduce the AV data, the AV data read from the optical disc is decrypted to provide the original video and audio signals.

For example, the optical disc drive shown in FIG. 1 is adapted to encrypt, using a disc key to encrypt an entire AV data for recording into an optical disc, a sector key to encrypt the AV data for each program. The AV data is encrypted for each program using the encrypted disc key and recorded along with the disc key and encrypted sector key into the optical disc.

When reproducing the AV data, the optical disc drive uses the disc key and encrypted sector key to decrypt the sector key, and the decrypted sector key to decrypt the encrypted AV data.

Normally, such encryption and decryption are not laid open in detail to the public from the standpoint of the prevention of illegal or impermissible copy. Therefore, the ordinary user cannot illegally copy AV data so long as he or she does not know how an IC (integrated circuit) to encrypt data in the optical disc drive is configured.

Concerning the above-mentioned phase-change type optical disc, when a same data is repeatedly recorded in a same place in the disc, recording marks and their periphery are deteriorated due to a thermal stress and others. Thus, the optical disc is limited in its capability of repeatedly recording data in it as the case may be. To avoid recording sync signals having a same signal pattern in a same place in the optical disc, it has been proposed to shift the recording position at random, namely, to adopt the Start Position Shift (SPS) method.

However, if the configuration of the IC used in the optical disc drive to encrypt data is known to a person who would try an illegal copying, a method of decrypting the encrypted data will also be known to him, so an AV data recorded in an original optical disc may possibly be copied into another optical disc.

Further, along with the increasingly greater interest in the security such as copy protection, it has been more and more demanded to prevent illegal copy by recording a unique disc identification (ID) information into each optical disc.

SUMMARY OF THE INVENTION

It is therefore an object of the present invention to overcome the above-mentioned drawbacks of the prior art and meet the requirements for illegal copy preventing by providing an optical disc having an ID number written therein by the SPS method to make it impossible to reproduce a data illegally copied from the optical disc, and a method of recording data into the optical disc.

According to the present invention, there is provided an optical disc having a plurality of sectors each including a header area and recording area, in which a position where a predetermined amount of data is recorded in the recording area of each sector provides an ID information for the optical disc.

According to the present invention, there is provided an optical disc having a plurality of segments each including a header area and recording area, in which a position where a predetermined amount of data is recorded in the recording area of each segment provides an ID information for the optical disc.

According to the present invention, there is provided a method of recording data into an optical disc having a plurality of sectors each including a header area and recording area, in which a position where a predetermined amount of data is recorded in the recording area of each sector provides an ID information, comprising the steps of:

firstly encrypting, using the ID information in the optical disc, a disc key to encrypt a user data included in the predetermined amount of data;

secondly encrypting, using the firstly encrypted disc key, a sector key to encrypt the user data for each program; and thirdly encrypting the user data using the secondly encrypted sector key, thereby recording the encrypted user data into the recording area of the optical disc.

According to the present invention, there is provided a method of recording data into an optical disc having a plurality of segments each including a header area and recording area, which a position where a predetermined amount of data is recorded in the recording area of each segment provides an ID information, comprising the steps of:

firstly encrypting, using the ID information in the optical disc, a disc key to encrypt a user data included in the predetermined amount of data;

secondly encrypting, using the firstly encrypted disc key, a sector key to encrypt the user data for each program; and thirdly encrypting the user data using the secondly encrypted sector, thereby recording the encrypted user data into the recording area of the optical disc.

In the method of recoding data into the optical disc according to the present invention, the ID information recorded in the optical disc is used to firstly encrypt a disc key to encrypt a user data included in a predetermined amount of data, the firstly encrypted disc key is used to secondly encrypt the data for each program, and the secondly encrypted sector key is used to thirdly encrypt the user data for each program, thus encrypting optical discs differently from one another.

BRIEF DESCRIPTION OF THE DRAWINGS

These objects and other objects, features and advantages of the present intention will become more apparent from the following detailed description of the preferred embodiments of the present invention when taken in conjunction with the accompanying drawings, of which:

FIGS. 3(A) to 3(B) schematically illustrate together a recording format in the optical disc in FIG. 2;

FIGS. 4(A) to 4(C) schematically illustrate together a medium ID recorded in the optical disc in FIG. 2;

FIGS. 5(A) and 5(B) schematically illustrate together the medium ID recorded in the optical disc in FIG. 2;

FIGS. 12(A) to 12(D) schematically illustrate together a method of indicating an ID information at recording positions of two ECC blocks in the optical disc in FIG. 10;

FIG. 13 is an explanatory drawing of a recorded content in the segment in the optical disc in FIG. 10; and FIGS. 14(A) and 14(B) schematically illustrate together a method of detecting a recording position defining a ID information in the optical disc in FIG. 10.

DETAILED DESCRIPTION OF THE PREFERRED EMBODIMENTS

Figure 1:
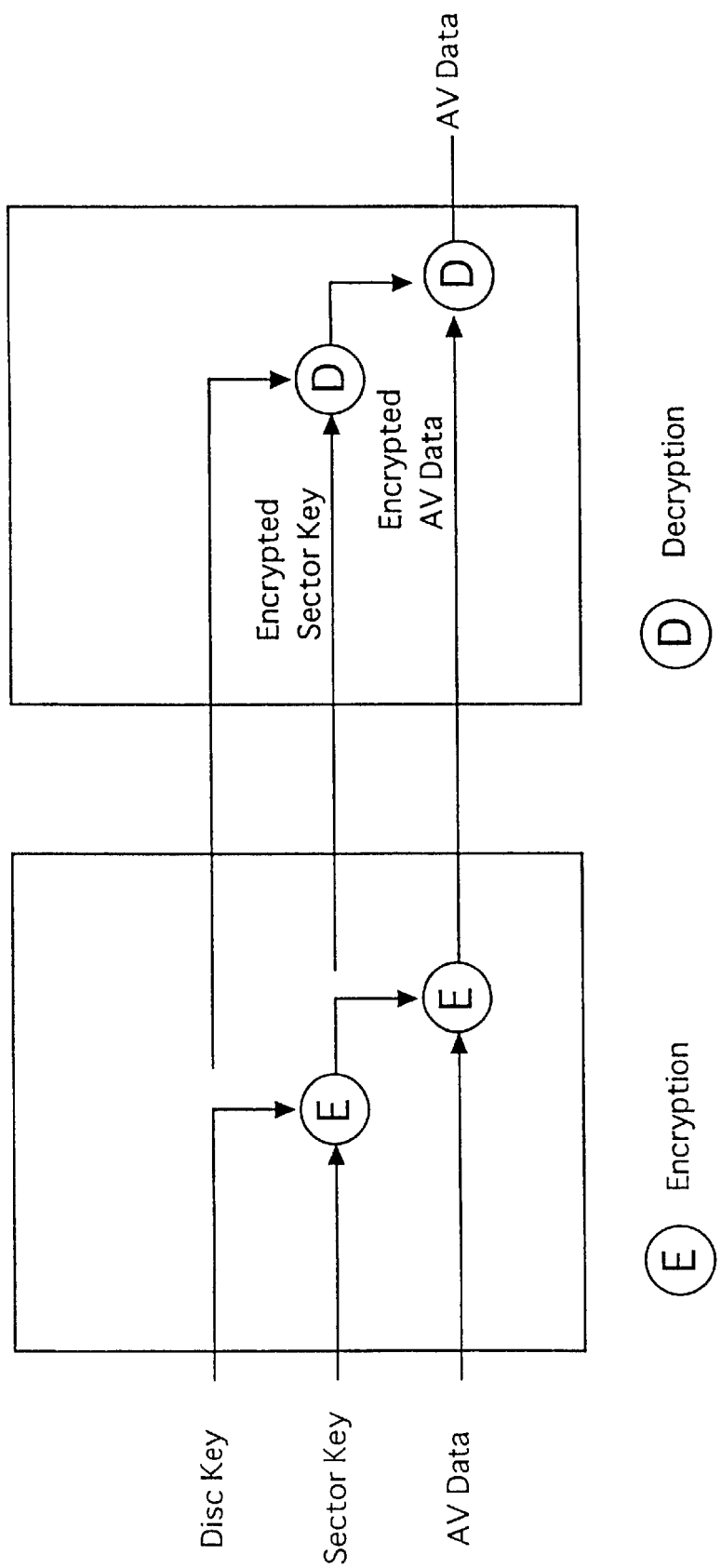
FIG. 1 is a schematic diagram of a conventional optical disc drive.
Figure 2:
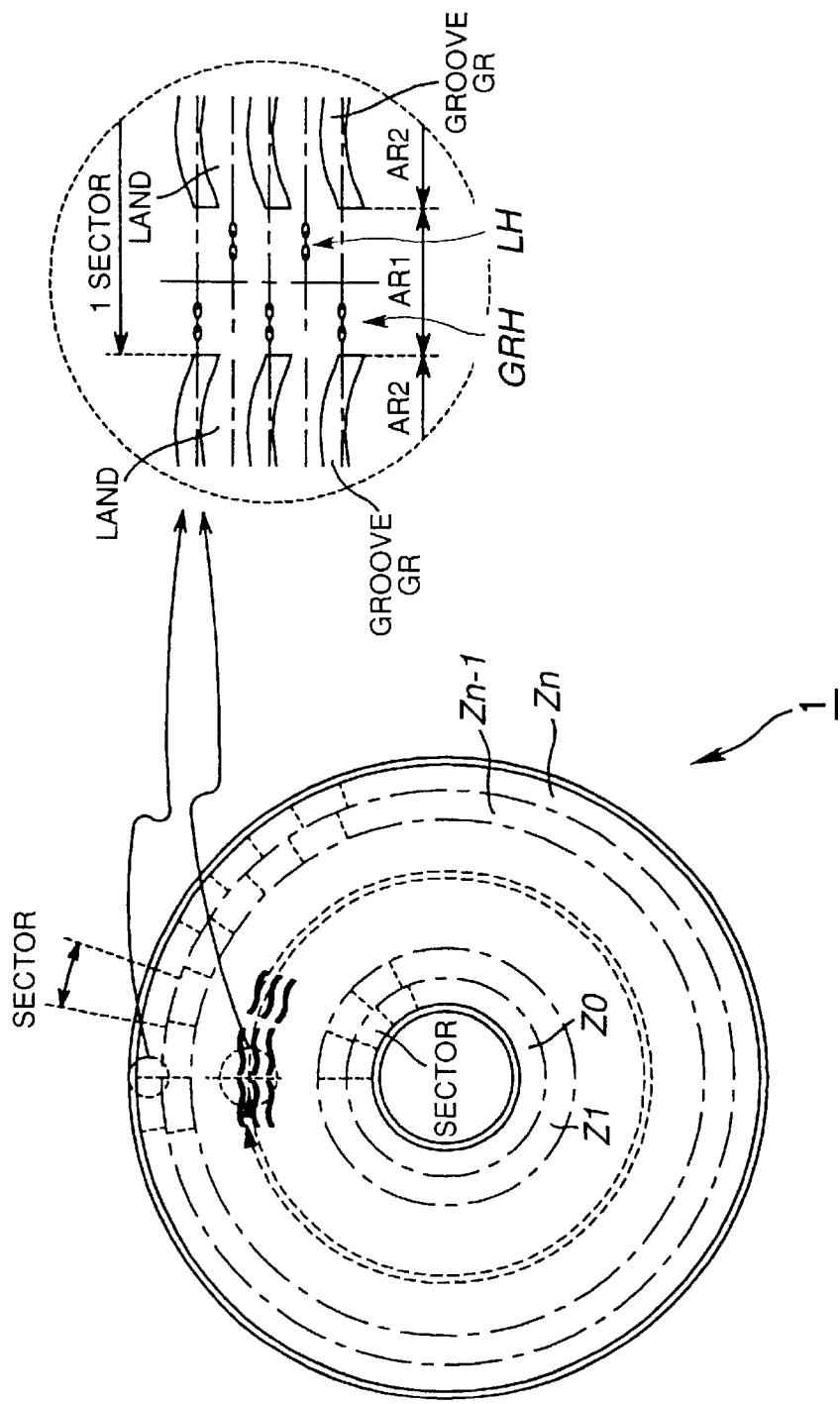
FIG. 2 is an explanatory drawing of an embodiment of the optical disc according to the present invention.

Referring now to FIG. 2, there is illustrated a first embodiment of the optical disc according to the present invention. The optical disc is generally indicated with a reference 1.

The optical disc 1 has the data recording surface thereof divided radially thereof into a plurality of sectors and also divided circumferentially thereof into a plurality of zones Z0 to Zn.

Each of the sectors has a leading area assigned to a header area AR1 for writing an address, and the remainder assigned to a recording area AR2 for writing. The recording area AR2 has wobbling grooves GR formed therein. In the innermost zone Z0, there are formed grooves GR wobbling at predetermined period. The grooves GR in the zones going toward the outer periphery are formed to wobble at increasingly shorter period. The header areas AR1 are discretely disposed on the optical disc 1. Address information for each sector is recorded in the header area AR1. The header area AR1 has a length equal to the predetermined wobbling period of the groove GR.

In the former half of the header area AR1, there are formed embossed pits for a groove header GRH in the middle of a track between the grooves GR. Also in the latter half of the header area AR1, there are formed embossed pits for a land header LH in the middle of a track between lands.

As shown in FIG. 3(A), the header area AR1 of the optical disc 1 includes Header 1, Gap, Header2, and Gap. An information carried by the embossed pits of the groove header GRH corresponds to the Header1, and an information carried by the embossed pits of the land header LH corresponds to the Header2. The Header1 and Header 2 includes a sector mark SM, synchronization timing data VFO1 and VFO2, address marks AM1 and AM2, identifiers ID1 and ID2, and a postamble PA1.

The recording area AR2 of the optical disc 1 includes a record start guard Guard1, a synchronization timing data VFO, data start position indicator SYNC, main recorded data DATA, postamble PA, record end guard area Guard2, and Buffer.

In the data recording area AR2, the data including VFO, SYNC, DATA and PA (will be referred to as "recorded data" hereinafter) include AV data such as video and audio signal, and other data such as synchronization information, and are frequently rewritten. The recorded data is in a predetermined amount, and recorded together as shown hatched in FIGS. 3(A) to 3(C). Each optical disc 1 has a unique identification information (will be referred to as "medium ID" hereinunder). The medium ID is identified based on a position where a data is recorded in the recording area AR2 of each sector of the optical disc 1. When necessary, the recorded data itself is rewritten but its recorded position remains unchanged. Thus, even when the recorded data is rewritten, the medium ID will not be changed at all. It should be noted that the medium ID is to be changed, the position of the recorded data has to be shifted to another position.

To record a medium ID by shifting the position of recorded AV data in this way will be referred to as "recording by SPS (Start Position Shift method)" hereinunder.

In the SPS recording, a 1-bit medium ID is recorded in one sector (8 kB), for example. As shown in FIG. 3(B), when the Guard1 area is reduced while the Guard2 area is expanded in the recording area AR2, the data including VFO, etc. is recorded in a position shifted toward the leading end of the recording area AR2, for example. The medium ID of 1 bit indicates "0" for example.

On the contrary, when the Guard1 area is expanded while the Guard2 are is reduced as shown in FIG. 3(C), the data including VFO, etc. is recorded in a position shifted toward the trailing end of the recording area AR2. At this time, the medium ID of 1 bit indicates "1", for example. The medium ID is identified based on an assembly of such 1-bit information in each sector.

It should be noted that all medium ID information may be SPS-recorded or a part of the medium ID information may be SPS-recorded. Also note that it is assumed that a medium ID includes 128 bits.

All information of an 128-bit medium ID, for example, are SPS-recorded as will be described below. For example, a medium ID of 1 bit is recorded in one sector as shown in FIG. 4(A). One ECC block consists of 8 sectors. Therefore, a medium ID of 8 bits is recorded in one ECC block as shown in FIG. 4(B). Therefore, a medium ID of 128 bits is recorded in 16 ECC blocks as shown in FIG. 4(C).

Also, a part of a medium ID information may be SPS-recorded and the remainder be recorded in the recording area AR2. For example, eight of the 128 bits of the medium ID may be SPS-recorded while the remaining 120 bits may be recorded in the recording area AR2 as shown in FIGS. 5(A) and 5(B), peculiar to the optical disc 1, encryption key, optical disc manufacturer's name, contents creator's name, signature, date or similar.

Figure 6:
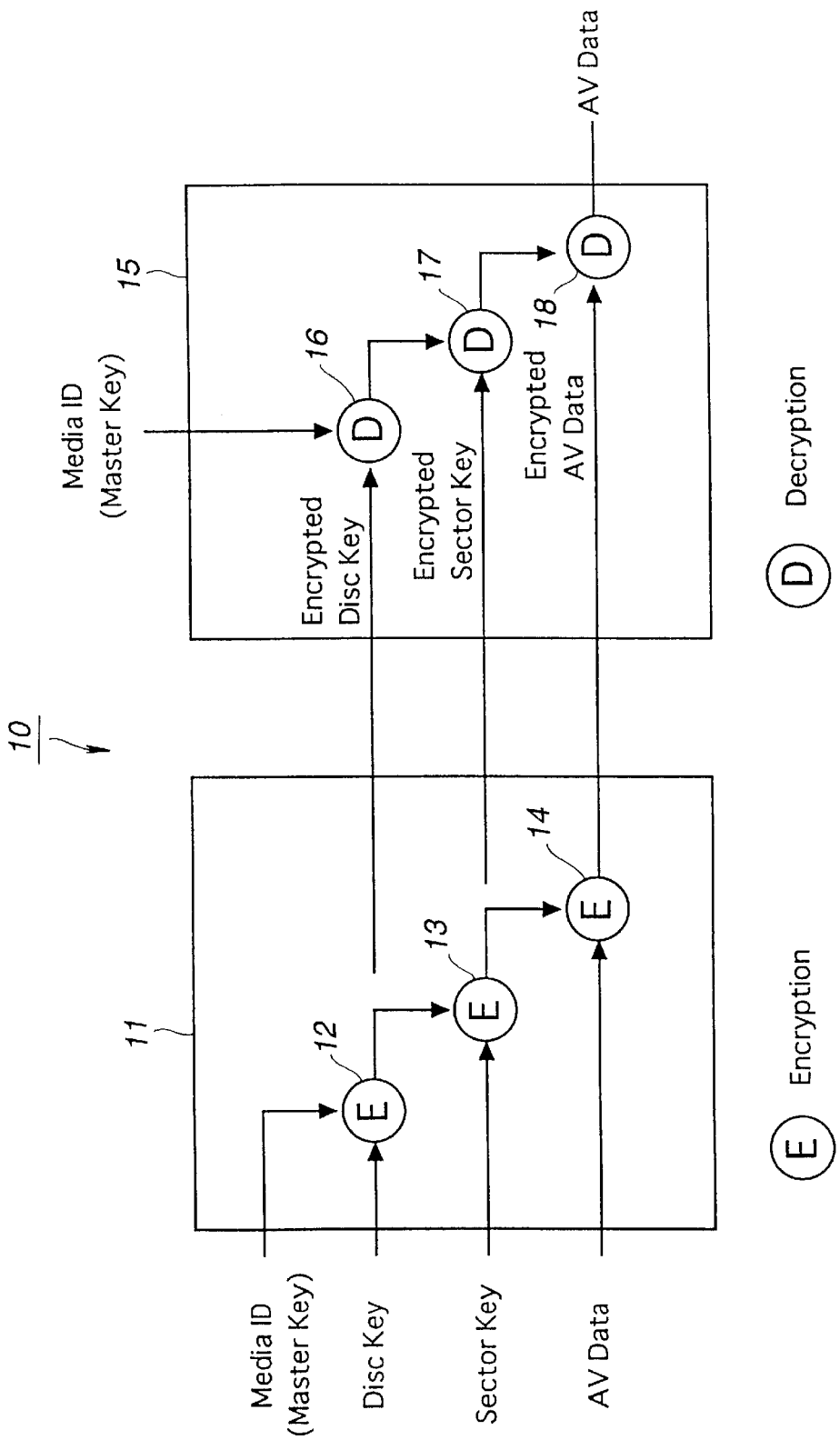
FIG. 6 is a schematic diagram of a disc drive for the optical disc according to the present invention.

Next, there will be described with reference to FIG. 6 an optical disc drive adapted to encrypt AV data for recording into the optical disc, and decrypt the data recorded in the optical disc 1 to reproduce the AV data. The optical disc drive is generally indicated with a reference 10.

The optical disc drive 10 comprises a recording unit 11 to encrypt AV data for recording into the optical disc 1, and a reproducing unit 15 to decrypt the AV data read from the optical disc 1.

The recording unit 11 comprises a first encryption circuit 12 to encrypt, using a medium ID peculiar to the optical disc 1, a disc key to encrypt AV data as a whole, a second encryption circuit 13 to encrypt, using the encrypted disc key, a sector key to encrypt the AV data for each program, and a third encryption circuit 14 to encrypt the AV data for each program using the encrypted sector key. The encrypted data as well as the disc key and encrypted sector key are recorded into the optical disc 1.

Thus, by encrypting AV data using the medium ID peculiar to the optical, the optical disc drive 10 can encrypt each optical disc 1 uniquely.

On the other hand, the reproducing unit 15 has a first decryption circuit 16 to decrypt the encrypted disc key using the medium ID of the optical disc 1, a second decryption circuit 17 to decrypt the encrypted sector key using the disc key, and a third decryption circuit 18 to decrypt the encrypted AV data using the sector key.

Thus, the optical disc drive 10 decrypts the AV data using the medium ID for the optical disc 1. For example, even if the AV data has been illegally copied directly from another optical disc, it is possible to prevent the illegally copied AV data from being decrypted since the medium ID of the original optical disc is different from that of the optical disc in which the AV data is recorded illegally.

Figure 7:
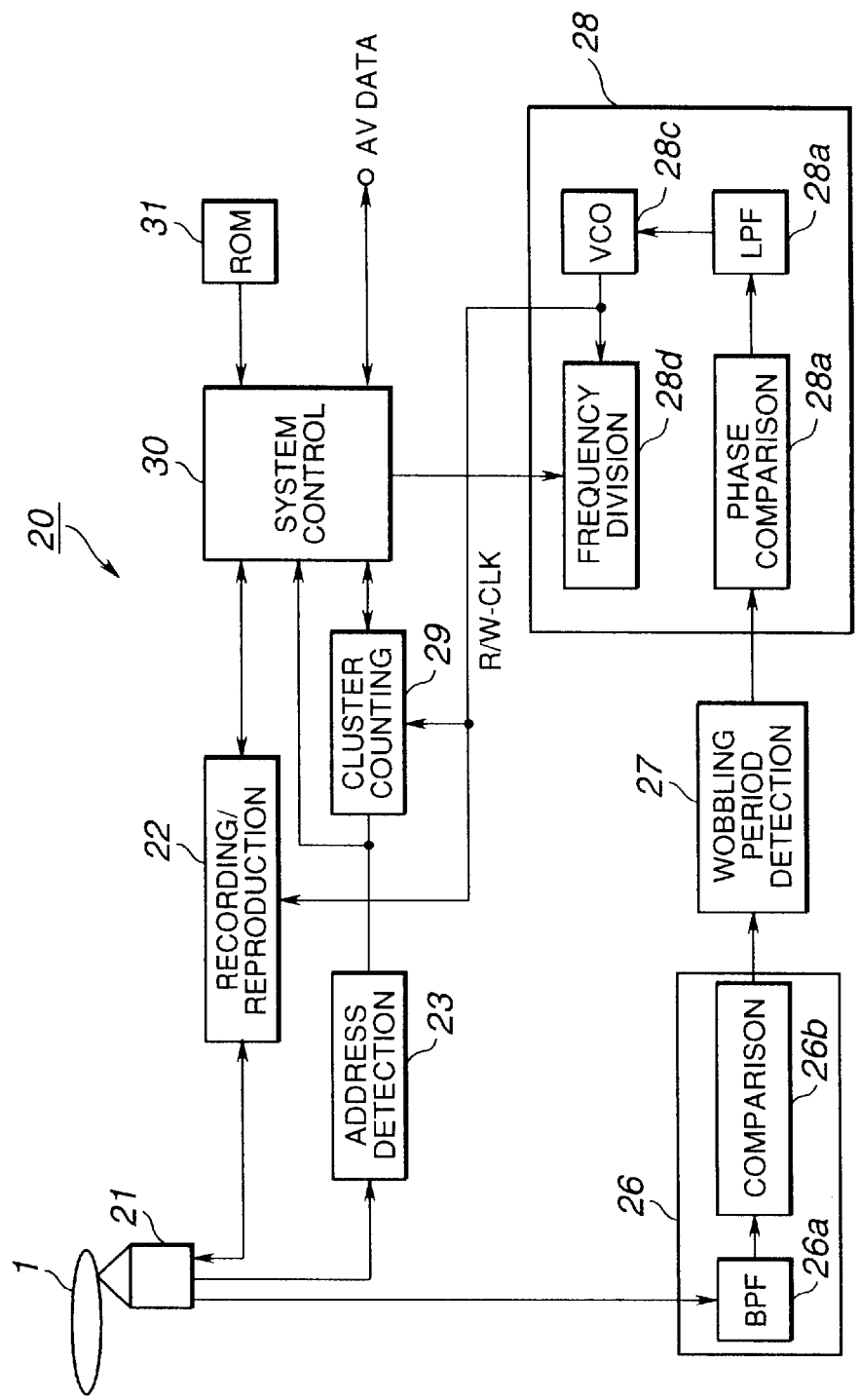
FIG. 7 is a schematic block diagram of the optical disc drive in FIG. 6.

FIG. 7 illustrates another optical disc drive adapted to record or reproduce AV data into or from the optical disc 1. The optical disc drive is generally indicated with a reference 20.

The optical disc drive 20 comprises an optical head 21 to write/read the optical disc 1 using a laser light, a recording/reproduction circuit 22 to modulate/demodulate subject AV data in a predetermined manner, an address detection circuit 23 to detect an address of the AV data being read from the optical disc 1, a wobble signal detection circuit 26, a wobbling period detection circuit 27 to detect the period of the wobble signal, a PLL (Phase-Locked Loop) circuit 28 to generate a predetermined clock based on the wobble signal, a cluster counter 29 to count the address position, a system control circuit 30 to control the above circuits, and a ROM 31 having predetermined data stored therein.

The optical head 21 writes into the optical disc 1 an AV data supplied via the system control circuit 30 and recording/reproducing circuit 22. At this time, the system control circuit 30 encrypts the supplied AV data as will be further described later, and supplies the encrypted data to the recording/reproduction circuit 22 which will effect an error correction coding, modulation or similar on the data supplied from the system control circuit 30, and supply the data to the optical head 21.

The optical head 21 detects a return or reflected light of the laser light from the optical disc 1, and supplies a detection output to the recording/reproducing circuit 22, address detection circuit 23 and wobble signal detection circuit 26.

The recording/reproducing circuit 22 effects an error correction coding, demodulation or similar on the AV data supplied from the optical head 21, and supplies the data thus processed to the system control circuit 30 which will decrypt the AV data supplied from the recording/reproduction circuit 22 as will be further described later.

The address detection circuit 23 decodes an address data from the optical head 21, detects error in the address data, and supplies the decoded address to the cluster counter 29 and system control circuit 30.

The wobble signal detection circuit 26 comprises a band-pass filter (BPF) 26a to remove noise component from the wobble signal and a binary-coding comparator 26b. The BPF 26a is supplied with a groove and/or land wobbling detection output (wobble signal) recorded in the optical disc 1 via the optical head 21. The BPF 26a removes noise component from the wobble signal, and supplies it to the comparator 26b which will provide a binary-coding of the wobble signal supplied from the BPF 26a to produce a wobbling detection pulse for supply to the wobbling period detection circuit 27.

The wobbling period detection circuit 27 judges the periodicity of the wobbling detection pulse. When the pulse is decided to have a predetermined periodicity, the detection circuit 27 will supply the pulse to the PLL circuit 28. If not, it is meant that a servo control is in the pull-in status.

The PLL circuit 28 comprises a phase comparator 28a, a low-pass filter (LPF) 28b, a voltage control oscillator (VCO) 28c, and a frequency divider 28d.

The phase comparator 28a makes a comparison in phase between the wobbling detection pulse from the wobbling period detection circuit 27 and a pulse from the frequency divider 28d to produce a phase comparison error signal indicative of a phase difference. This signal is supplied to the VCO 28c via the LPF 28b. The VCO 28c generates a channel clock (will be referred to as "R/W clock" hereinunder) based on the phase comparison error signal, and supplies it to the frequency divider 28d and cluster counter 29. The frequency divider 28d has the frequency division ratio controlled by the system control circuit 30, divides the frequency of the R/W clock from the VCO 28c to generate a pulse having a same frequency as the wobble signal, and supplies the generated pulse to the phase comparator 28a. With these operations, a predetermined R/W clock is generated based on the wobble signal.

Thus, the PLL circuit 28 can generate, based on the wobble signal supplied from the optical disc 1, an accurate R/W clock which allows data to be recorded/reproduced with a high density and no redundancy.

Based on the address from the address detection circuit 23 and R/W clock from the VCO 28c, the cluster counter 29 generates a sync signal for synchronization with the period of the address, and counts a next address position. Also when no next address position can be detected, a next address position is determined from the cluster counter 29 and thus the address is counted up.

The system control circuit 30 is adapted to control the rotation of a sled motor (not shown) based on the address detected by the cluster counter 29 for the optical head 21 to access to a predetermined position on the optical disc 1 for data recording and/or reproduction at the cluster recording/reproducing timing. The ROM 31 has stored therein a data of a frequency division ratio for the frequency divider 28d corresponding to the address, and the system control circuit 30 controls the frequency division ratio of the frequency divider 28d based on the data from the ROM 31.

Figure 8:
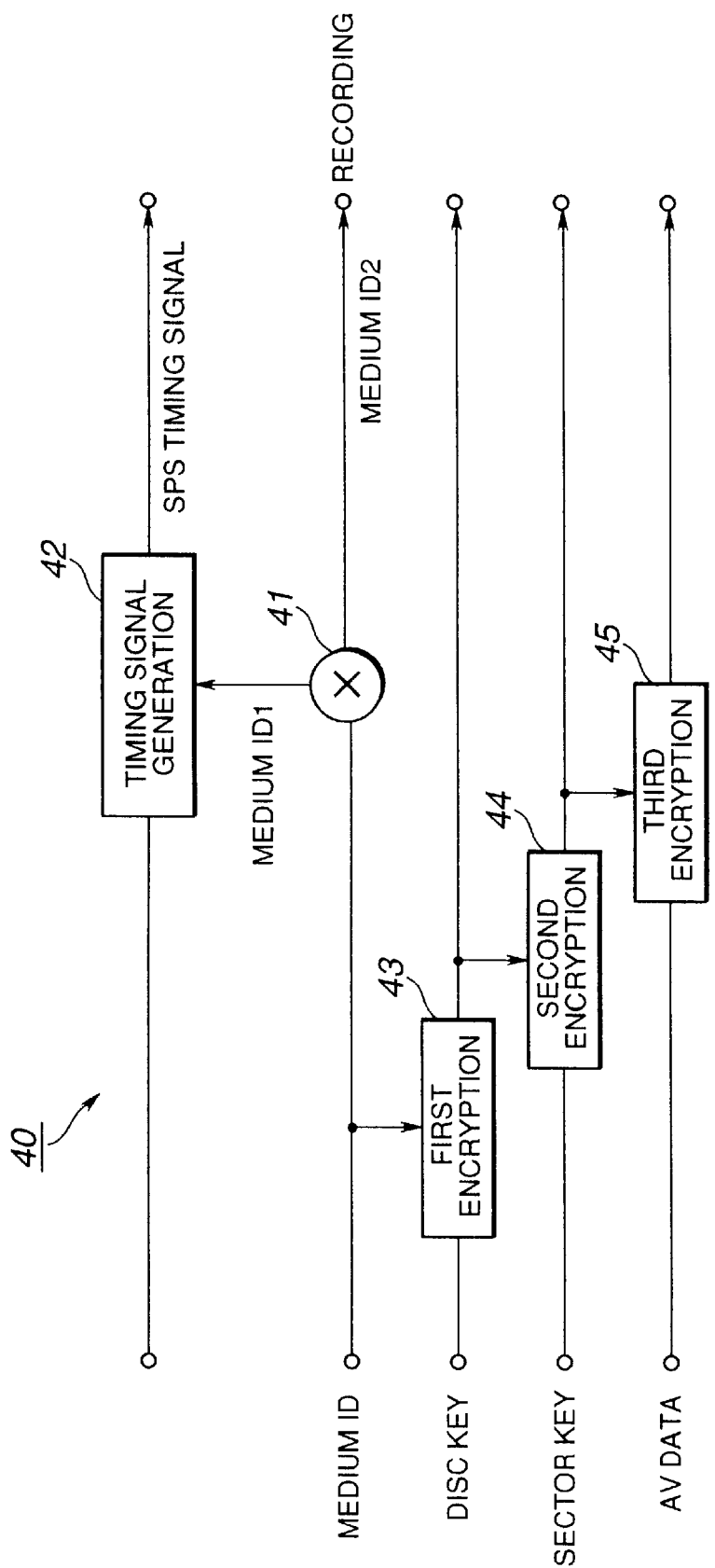
FIG. 8 is a schematic block diagram of an encryption unit in a system control circuit of the disc drive in FIG. 6.
Figure 9:
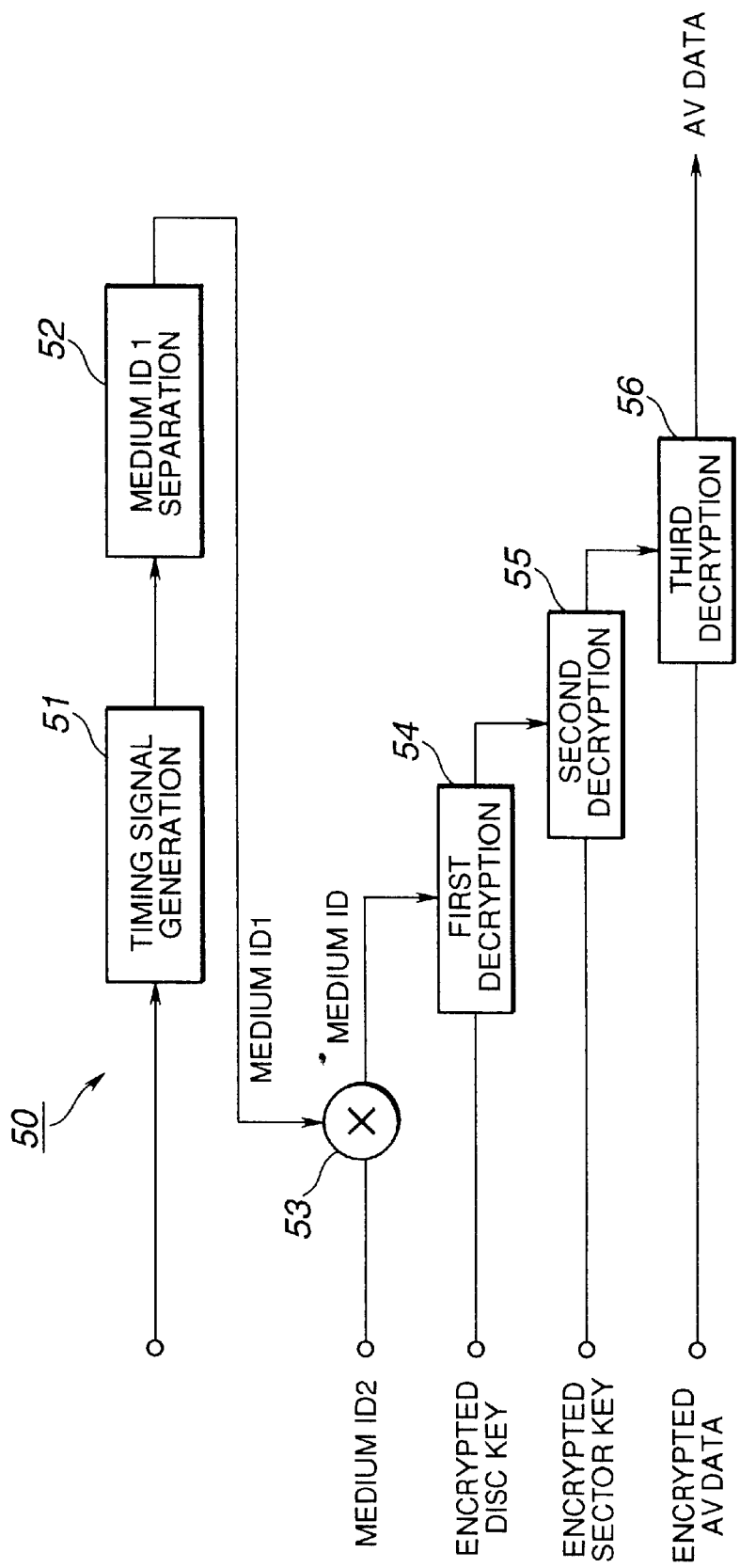
FIG. 9 is a schematic block diagram of a decryption unit in the system control system in FIG. 8.

Also the system control circuit 30 comprises an encryption unit 40 shown in FIG. 8 and provided for the aforementioned purpose of encryption, and a decryption unit 50 shown in FIG. 9.

The encryption unit 40 uses a medium ID, disc and sector keys as encryption keys to encrypt an input AV data. It should be noted that the disc key is intended for encryption of an AV data as a whole for writing into the optical disc and the sector key is intended for encryption of the AV data for each program.

The encryption unit 40 comprises a medium ID separation circuit 41, and SPS timing signal generation circuit 42 to generate a timing signal for SPS recording, a first encryption circuit 43 to encrypt the disc key, a second encryption circuit 44 to encrypt the sector key, and a third encryption circuit 45 to encrypt AV data.

The medium ID is supplied to the medium ID separation circuit 41 and first encryption circuit 43. For example, the medium ID is formed from 128 bits of which eight (will be referred to as "medium ID1" hereinunder) are SPS-recorded into the optical disc 1 while the remaining 120 bits (will be referred to as "medium ID2" hereinunder) are recorded in the recording area AR2.

The medium ID separation circuit 41 separates a medium ID into a part of 8 bits and another part of 120 bits. The part of 8 bits is taken as the medium ID1 for SPS-recording into the optical disc 1, while the part of 120 bits is taken as the medium ID2 for recording into the recording area AR2. The medium ID separation circuit 41 supplies the medium ID1 to the SPS timing signal generation circuit 42 and the medium ID2 to the recording/reproduction circuit 22.

Based on predetermined data such as an address read from the optical disc 1 and the medium ID1 from the medium ID separation circuit 41, the timing signal generation circuit 42 generates an SPS timing signal under which the position of the data recorded in the recording area AR2 is shifted, and supplies the SPS timing signal to the recording/reproduction circuit 22.

On the other hand, the first encryption circuit 43 uses the medium ID to encrypt the disc key, and supplies the encrypted disc key to the second encryption circuit 44 and also to the recording/reproduction circuit 22.

The second encryption circuit 44 uses the encrypted disc key to encrypt the sector key, and supplies the encrypted sector key to the third encryption circuit 45 and recording/reproduction circuit 22.

The third encryption circuit 45 uses the encrypted sector key to encrypt AV data including video, audio and similar signal, and supplies the encrypted AV data to the recording/reproduction circuit 22.

Based on the supplied SPS timing signal supplied from the system control circuit 30, the recording/reproduction circuit 22 increases or decreases the amount of data in the Guard1 of the recording area AR2 shown in FIG. 3 to shift the position of the recorded data such as VFO, DATA, etc. When the position of the recorded data is thus shifted, a medium ID of 1 bit is recorded in one sector and a medium ID1 of 8 bits is recorded in 8 sectors. The recording/reproduction circuit 22 records as the recorded data such as DATA, etc. the medium ID2, encrypted disc key, encrypted sector key and encrypted AV data.

As in the foregoing, the optical disc drive 20 can use the medium ID peculiar to the optical disc 1 to encrypt AV data and record the encrypted AV data into the optical disc 1. More particularly, the optical disc drive 20 can record uniquely encrypted AV data into each optical disc. Note that the encrypted disc key and sector key may of course be recorded as recorded data as in the above or by the SPS method.

Simultaneous recording of a medium ID and AV data has been described in the foregoing. However, in case a medium ID is already recorded in the optical disc 1, the medium ID may be read and then predetermined keys and AV data may be encrypted based on the medium ID. Also, a medium ID as a whole, not separated, may be SPS-recorded via the SPS timing signal generation circuit 42.

On the other hand, the decryption unit 50 is supplied with the medium ID land medium ID2, encrypted disc key, encrypted sector key and encrypted AV data via the optical head 21 and recording/reproduction circuit 22. Using the supplied medium ID1, etc., the decryption unit 50 can decrypt the encrypted AV data.

As shown in FIG. 9, the decryption unit 50 comprises an SPS timing signal generation circuit 51, a medium ID 1 separation circuit 52 to separate the medium ID1 from the SPS timing signal, a medium ID combining circuit 53 to combine the medium ID1 and medium ID2, a first decryption circuit 54 to decrypt the encrypted disc key, a second decryption circuit 55 to decrypt the encrypted sector key, and a third decryption circuit 56 to decrypt the encrypted AV data.

Based on the position of the data VFO, DATA, etc. recorded in the recording area AR2 shown in FIG. 3, the SPS timing generation circuit 51 generates an SPS timing signal, and supplies the SPS timing signal to the medium ID1 separation circuit 52.

The medium ID1 separation circuit 52 separates the medium ID1 from the SPS timing signal, and supplies it to the medium ID combining circuit 53.

The medium ID combining circuit 53 combines the medium ID1 supplied from the medium ID1 separation circuit 52 with the medium ID2 read from the optical disc 1 to generate a medium ID which will be supplied to the first decryption circuit 54.

Using the medium ID, the first decryption circuit 54 decrypts the encrypted disc key, and supplies the decrypted disc key to the second decryption circuit 55 in which the decrypted disc key will be used to decrypt the encrypted sector key. The decrypted sector key is supplied to the third decryption circuit 56 in which the decrypted sector key will be used to decrypt the encrypted AV data. The AV data thus decrypted is supplied as output.

As having been described in the foregoing, the optical disc drive 20 uses the medium ID1 and medium ID2 peculiar to the optical disc 1 to decrypt the encrypted AV data. Therefore, the optical disc drive 20 cannot decrypt any AV data from an optical disc 1 in which the AV data is illegally copied. Thus, even if an AV data in one optical disc is illegally copied directly into another optical disc, the AV data cannot be decrypted, thus permitting to prevent illegal copying.

The optical disc drive 20 which records the medium ID1 by the SPS method while recording the medium ID2 as a record data has been described in the foregoing. However, the present invention is not limited only to this embodiment. For example, the medium ID (including the medium ID1 and medium ID2) may be SPS-recorded in the optical disc 1. At this time, the first decryption circuit 54 may be adapted to decrypt the encrypted disc key based on the medium ID read from the optical disc 1 and supplied via the SPS-recording timing signal generation circuit 51 and medium ID1 separation circuit 52.

The aforementioned embodiment of the optical disc 1 is adapted to record a medium ID of 1 bit in one sector. However, the present invention is not limited only to this optical disc. For example, the optical disc may be adapted to divide the recording position of AV data such as VFO, DATA, etc. into 4 different positions in the recording area AR2 shown in FIG. 3, thereby recording a 2-bit medium ID in one sector. Similarly, the optical disc may be adapted to record a medium ID of 3 or more bits in one sector.

Figure 10:
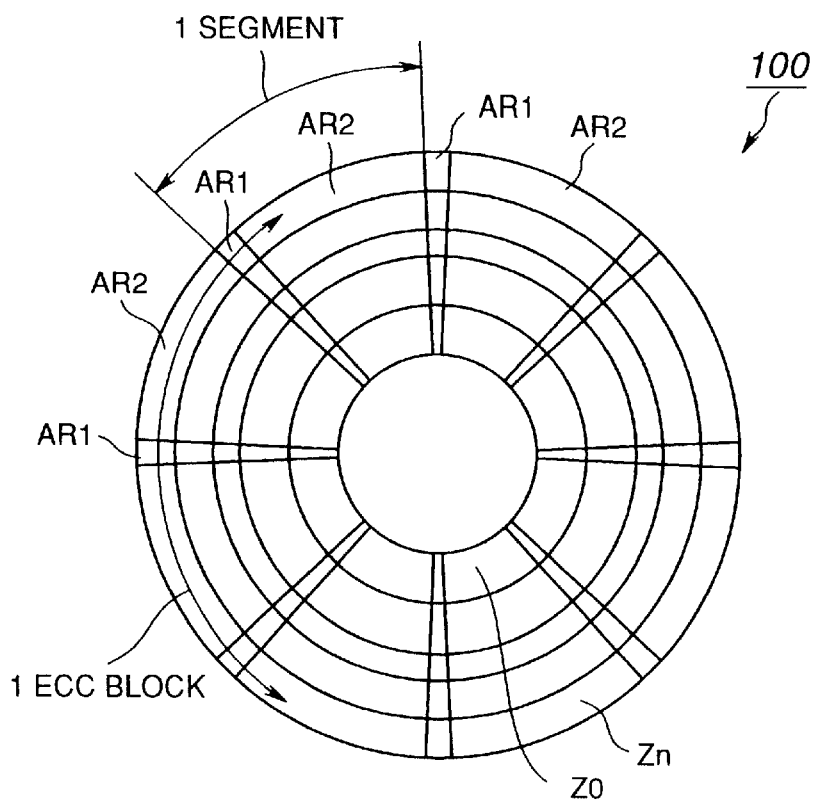
FIG. 10 is an explanatory drawing of another embodiment of the optical disc according to the present invention.

This embodiment of the optical disc 1 is adapted to record a medium ID of 1 bit in one sector. As shown in FIG. 10, however, the present invention can provide an optical disc 100 adapted to have a plurality of segments each including a header area AR1 and recording AR2, in which the position of a predetermined amount of data is recorded in the recording area AR2 of each segment provides an ID information, namely, medium ID.

The optical disc 100 has a reading/writing area thereof divided into a plurality of concentric zones Z0 to Zn. A same zone is designed to attain CAV (Constant Angular Velocity). In a same zone, the recording density along the innermost periphery is highest and becomes lower toward the outermost periphery of the optical disc 100. Also, the recording density at the innermost periphery of an outer one of two neighboring zones is same as that at the outermost periphery of an inner zone.

In this optical disc 100, the header area AR1 is designed to attain CAV and one segment extends from one to another header area.

The header area AR1 includes PLL pull-in VFO, address mark, track address, segment address, CRC, etc.

A data is recorded or reproduced taking an ECC (Error Check and Correction) block as one block. Data in one ECC block is recorded over a plurality of segments.

In this optical disc 100, an ID information of 1 bit is formed from first and second segments forming together the ECC block as shown in FIGS. 11(A) to 11(D), for example.

For example, in the optical disc 100, the number of channels in an area shifted in the SPS (Start Position Shift method) recording is 128, and the SPS area of 128 channels is divided by two into a first SPS area from the channel 0 to channel 64 and a second SPS area from channel 65 to channel 128.

Figure 11A:
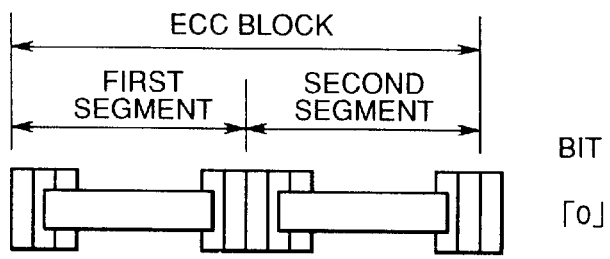
FIGS. 11(A) to 11(D) schematically illustrate together a method of indicating an ID information at recording positions of two segments forming together en ECC block in the optical disc in FIG. 10.
Figure 11B:
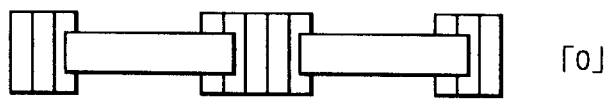

When both the first and second segments are recorded in a same SPS area, the ID information is "0". More particularly, when both the first and second segments are recorded in the first SPS area as shown in FIG. 11(A), or when the first and second segments are both recorded in the second SPS area as shown in FIG. 11(B), the ID information is "0".

Figure 11C:
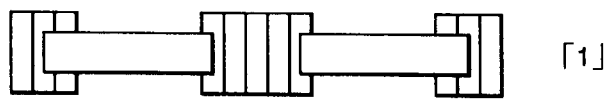
Figure 11D:
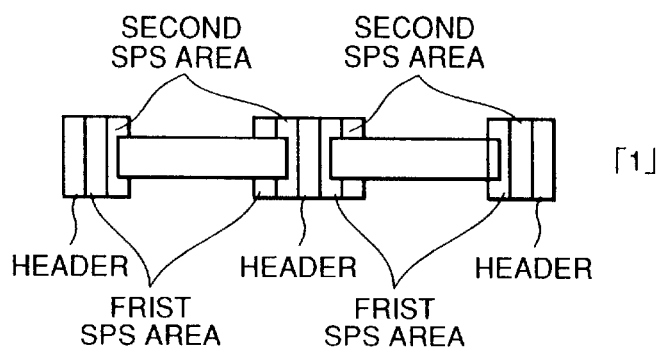

When the first and second segments are recorded in different SPS areas, the ID information is "1". More particularly, when the first segment is recorded in the first SPS area while the second segment is in the second SPS area as shown in FIG. 11(C), or when the first segment is recorded in the second SPS area while the second segment is in the first SPS area as shown in FIG. 11(D), the ID information is "1".

The SPS-recording positions are selected at random. However, by setting the recording positions of the first and second segments in the ECC block as in the above, an ID information of 1 bit can be formed from 2 segments.

Thus, the optical disc 100 has a plurality of segments each including a header area and recording area so that the recording positions of a predetermined amount of data in the recording area of each segment define together an ID information. The optical disc recording method according to the present invention is employed to firstly encrypt, using the above-mentioned ID information, a disc key to encrypt a user data included in the predetermined amount of data, secondly encrypt, using the firstly encrypted disc key, a sector key to encrypt the user data for each program, and thirdly encrypt the user data using the secondly encrypted sector key, thus recording at least the first to third encrypted user data into the optical disc 100.

As shown in FIG. 12, an ID information of 1 bit may also be formed from two ECC blocks.

When both an odd ECC block and even ECC block are within a same SPS area, the ID information is "0". When the odd ECC block and even ECC block are in a first SPS area as shown in FIG. 12(A) or when in a second SPS are as shown in FIG. 12(B), the ID information is "0".

When the odd ECC block and even ECC block are in different SPS areas, respectively, the ID information is "1". When the odd ECC block is in the first SPS area while the even ECC block is in a second SPS area as shown in FIG. 12(C) or when the odd ECC block is in the second SPS while the even ECC block is in the first SPS area as shown in FIG. 12(D), the ID information is "1".

Namely, with segments recorded in a same position within an ECC block, the recording positions of an odd ECC block and even ECC block define together an ID information "1".

An recording position is detected as in the following:

FIG. 13 shows an information for recording into a segment. As shown, the header area AR1 includes GUARD, VFO, etc. while the data area AR2 includes a user data such as FRAME SYNC.

The GUARD is an area for protection of data on the phase-change recording layer including SPS. The VFO is an area for PLL pull-in. The FRAME SYNC is a sync signal.

As shown in FIGS. 14(A) and 14(B), the recording position of FRAME SYNC varies depending upon the recording position of SPS. When the SPS is recorded over channels 0 to 64 as shown in FIG. 14(A), the FRAME SYNC is recorded in a SYNC area corresponding to the first SPS area. When the SPS is recorded over channels 65 to 128 as shown in FIG. 14(B), the FRAME SYNC is recorded in a SYNC area corresponding to the second SPS area. Therefore, when the FRAME SYNC is detected in a SYNC area corresponding to the first SPS area, the segment is recorded in the first SPS area. When the FRAME SYNC is detected in a SYNC area corresponding to the second SPS area, the segment is recorded in the second SPS area.

Namely, when the recorded data includes a sync signal, the recording position of the sync signal defines an ID information, so the ID information can be read by detecting the recording position of the sync signal.

The number of channels over which the area is shifted by the SPS method is not limited to 128 but it may be set to 64 or 256.

As having been described in the foregoing, the present invention provides an optical disc formed from sectors each including a header area and recording area. The position of a predetermined amount of data recorded in the recording area of each sector defines an ID information, so that an ID information peculiar to each optical disc can be recorded.

Also, the present invention provides an optical disc formed from segments each including a header area and recording area. The position where a predetermined amount of data is recorded in the recording area of each segment defines an ID information, so that an ID information peculiar to each optical disc can be recorded.

Further, the present invention provides a method of recording data into an optical disc, adapted to firstly encrypt a disc key to encrypt the entire data, secondly encrypt, using the firstly encrypted disc key, a sector key to encrypt the data for each program, thirdly encrypt the data using the secondly encrypted sector key, and recording the encrypted data into the recording area of the optical disc, thereby permitting to record the data encrypted uniquely for each optical disc.

Furthermore, the present invention provides a phase-change type optical disc designed to enhance the reliability including its life by the SPS (Start Position Shift) method by which the recording position can be shifted at random so that information can be safely recorded using its recorded position as the ID information. By identifying a data based on at least two recording-position information, it is not necessary to fix a recording position at every recording but the reliability, including the life, of the recording medium can be enhanced for the main purpose of illegal copy prevention by shifting the recording position of data. The ID information can have information bits thereof closed by an ECC block, namely, can be closed along with data information in each ECC block.

What is claimed is:

1. An optical disc having a plurality of sectors each including a header area and recording area, in which an actual position at which data, which includes audio and video information, is recorded in the recording area of each sector provides ID information, wherein said ID information uniquely identifies the optical disc.

2. The optical disc according to claim 1, wherein a part of the ID information is identified based on a position where the data is recorded in the recording area of each sector, and the remainder of the ID information is recorded in the recording area.

3. The optical disc according to claim 1, wherein the actual recording position of the data defines ID information of 1 or more bits depending upon whether the recording position is shifted toward the leading end or trailing end of the recording area.

4. The optical disc according to claim 1, wherein the sector has a header formed from a pit address.

5. The optical disc according to claim 1, wherein the sector has an address formed from a groove and/or land wobbling.

6. The optical disc according to claim 1, wherein the ID information is a number peculiar to the optical disc.

7. The optical disc according to claim 1, wherein the ID information is an encryption key to encrypt data.

8. A method of recording data into an optical disc having a plurality of sectors each including a header area and recording area, comprising the steps of:
    encrypting a disc key using identification (ID) information provided by a position where data which includes audio and video information is recorded in the recording area in which said ID information identifies said optical disc;
    encrypting a sector key using the encrypted disc key;
    encrypting user data using the encrypted sector key; and
    recording the encrypted user data into the recording area of the optical disc.

9. The method according to claim 8, wherein a timing signal is generated based on the ID information and during recording of the data, the ID information is recorded by shifting, based on the timing signal, the recording position of the data for recording into the recording area of each sector of the optical disc.

10. The method according to claim 8, wherein a timing signal is generated based on a part of the ID information and during recording of the data, the part of the ID information is recorded by shifting, based on the timing signal, the recording position of the data for recording into the recording area of each sector of the optical disc while the remainder of the ID information is recorded as the user data into the recording area.

11. The method according to claim 8, wherein the ID information is read based on the position of the data recorded in the recording area of each sector of the optical disc and the read ID information is used to effect the encryption.

12. An optical disc having a plurality of segments each including a header area and recording area, in which an actual position at which data, which includes audio and video information, is recorded in the recording area of each segment provides ID information, wherein said ID information uniquely identifies the optical disc.

13. The optical disc according to claim 12, wherein a 1-bit ID information is formed from two or more segments.

14. The optical disc according to claim 13, wherein an error correction block is formed from a plurality of segments and a 1-bit ID information is formed from two of the plurality of segments in the error correction block.

15. The optical disc according to claim 13, wherein a 1-bit ID information is formed from two error correction blocks.

16. The optical disc according to claim 12, wherein the recorded data includes a sync signal whose actual recorded position provides ID information.

17. A method of recording data into an optical disc having a plurality of segments each including a header area and recording area, comprising the steps of:
    encrypting a disc key using identification (ID) information obtained by a position where data which includes audio and video information is recorded in the recording area in which said ID information identifies said optical disc;
    encrypting a sector key using the encrypted disc key;
    encrypting user data using the encrypted sector key; and
    recording the encrypted user data into the recording area of the optical disc.

18. The method according to claim 17, wherein a timing signal is generated based on the ID information and during recording of the data, the ID information is recorded by shifting, based on the timing signal, the recording position of the data for recording into the recording area of each segment of the optical disc.

19. The method according to claim 17, wherein a timing signal is generated based on a part of the ID information and during recording of the data, the part of the ID information is recorded by shifting, based on the timing signal, the recording position of the data for recording into the recording area of each segment of the optical disc while the remainder of the ID information is recorded as the user data in the recording area.

20. The method according to claim 17, wherein the ID information is read based on the position where the data is recorded in the recording area of each segment of the optical disc and the read ID information is used to effect the encryption.

21. The method according to claim 17, wherein an ID information of 1 bit formed from two or more segments is read and the read ID information is used for the encryption.

22. The method according to claim 17, wherein an error correction block formed from a plurality of segments, an ID information of 1 bit formed from two of the plurality of segments in the error correction block is read from the optical disc, and the read ID information is used for the encryption.

23. The method according to claim 17, wherein an ID information of 1 bit formed from two error correction blocks is read from the optical disc and the read ID information is used for the encryption.

24. The method according to claim 17, wherein the recorded data also includes a sync signal whose recorded position provides an ID information, an ID information defined by the recording position of the sync signal is detected from the optical disc based on the recording position of the sync signal, and the detected ID information is used for the encryption.

* * * * *